United States Patent
Inoue (10) Patent No.: US 9,258,456 B2
(45) Date of Patent: Feb. 9, 2016

(54) IMAGE READING DEVICE, IMAGE FORMING APPARATUS, AND RECORDING MEDIUM

(71) Applicant: KYOCERA DOCUMENT SOLUTIONS INC., Osaka (JP)

(72) Inventor: Takashi Inoue, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/288,602

(22) Filed: May 28, 2014

(65) Prior Publication Data
US 2014/0355075 A1 Dec. 4, 2014

(30) Foreign Application Priority Data
May 31, 2013 (JP) ................................. 2013-115476

(51) Int. Cl.
| | | |
|---|---|---|
| *H04N 1/409* | (2006.01) | |
| *H04N 1/40* | (2006.01) | |
| *H04N 1/401* | (2006.01) | |
| *H04N 1/00* | (2006.01) | |
| *H04N 1/028* | (2006.01) | |
| *H04N 1/047* | (2006.01) | |
| *H04N 1/053* | (2006.01) | |

(52) U.S. Cl.
CPC ........... *H04N 1/401* (2013.01); *H04N 1/00045* (2013.01); *H04N 1/0281* (2013.01); *H04N 1/00002* (2013.01); *H04N 1/047* (2013.01); *H04N 1/053* (2013.01); *H04N 1/409* (2013.01); *H04N 1/4092* (2013.01); *H04N 2201/0081* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,649,031 | A * | 7/1997 | Nakamura et al. | 382/254 |
| 6,035,072 | A * | 3/2000 | Read | 382/275 |
| 6,721,457 | B1 * | 4/2004 | Atkins et al. | 382/260 |
| 2001/0030774 | A1 * | 10/2001 | Bromley | 358/474 |
| 2004/0028289 | A1 * | 2/2004 | Le Meur et al. | 382/275 |
| 2004/0179242 | A1 * | 9/2004 | Nakaya | 358/461 |
| 2005/0094215 | A1 * | 5/2005 | Nagasaka | 358/406 |
| 2006/0164700 | A1 * | 7/2006 | Hayashi | 358/518 |
| 2010/0245942 | A1 * | 9/2010 | Shimatani | 358/475 |
| 2011/0085214 | A1 * | 4/2011 | Shinkawa | 358/475 |

FOREIGN PATENT DOCUMENTS

| | | |
|---|---|---|
| JP | 2005-151269 A | 6/2005 |
| JP | 2012-085015 A | 4/2012 |

* cited by examiner

*Primary Examiner* — Richard Zhu
(74) *Attorney, Agent, or Firm* — Studebaker & Brackett PC (57) ABSTRACT

An image reading device includes an image reading section, an image processing section, and a density reference member. Based on a location of a defect in the image reading section or in the density reference member, the image processing section determines whether or not to at least partially restrict either a read range of the image reading section when the image reading section reads an original document or usage of a result obtained by reading the original document by the image reading section. The image processing section determines whether or not to apply a smoothing process to each density value detected by reading the original document by the image reading section. The determination is made based on a comparison between a normal-value determining threshold and each density value detected by reading the density reference member by the image reading section.

14 Claims, 8 Drawing Sheets

IMAGE READING DEVICE, IMAGE FORMING APPARATUS, AND RECORDING MEDIUM

INCORPORATION BY REFERENCE

The present application claims priority under 34 U.S.C. §119 to Japanese Patent Application No. 2013-115476, filed May 31, 2013. The contents of this application are incorporated herein by reference in their entirety.

BACKGROUND

The present disclosure relates to an image reading device for reading an original document, an image forming apparatus including the image reading device, and a non-transitory computer-readable recording medium storing a program for reading an original document.

An image reading device includes a light source and an imaging section. Typically, the image reading device reads an original document by detecting, with the imaging section, light that is emitted from the light source and then reflected from the original document. More specifically, the image reading device reads an image formed on an original document to generate image data. Such an image reading device is usable as a scanner. In addition, such an image reading device is also usable as a component of an image forming apparatus, such as a multifunction peripheral, a copier, or a facsimile.

Even when one image reading device reads the same original document, the amount of light detected by the imaging section may fluctuate for each reading operation. For example, the amount of light detected by the imaging section may fluctuate depending on changes in the ambient conditions. The amount of light detected by the imaging section may also fluctuate depending on changes in the light source, the optical system, and/or the imaging section. For this reason, the image reading device typically performs shading correction with the use of a density reference member to reduce the fluctuations in the reading result caused by the fluctuations in the amount of light.

By reading the density reference member, the density values of the pixels (the smallest elements of electronically coded image) are detected. The pixels constitute image data representing the density reference member. Ideally, the density values are generally uniform. Otherwise, it is ideal that the change among the density values be gradual. However, the density value of one pixel may be lower than the density values of other pixels. For example, if the light source has a defective portion, the density value of each pixel corresponding to the defective portion is lower than the density values of other pixels. If the density value of any pixel is lower than the density values of other pixels, the grayscale is set to fall within a narrow density range. Consequently, the quality of read images (the reading result) degrades.

Some image reading devices detect a defect in the LEDs based on the reading result of a white plate. More specifically, the level of the amount of light obtained by reading the white plate is compared with a threshold stored in advance to detect a defect in the LEDs. Any LED found to be defective is not used in reading and thus the size of a readable original document is limited.

SUMMARY

An image reading device according to the present disclosure reads an original document. The image reading device includes an image reading section, a density reference member, and an image processing section. The image reading section detects a density value of each of a plurality of pixels constituting image data. The image processing section performs image processing on the image data. Based on a location of a defect in the image reading section or in the density reference member, the image processing section determines whether or not to at least partially restrict either a read range of the image reading section when the image reading section reads the original document or usage of a result obtained by reading the original document by the image reading section. Also, based on a comparison between a normal-value determining threshold and each density value obtained by reading the density reference member by the image reading section, the image processing section determines whether or not to apply a smoothing process to each density value detected by reading the original document by the image reading section.

The image forming apparatus according to the present disclosure includes the image reading device described above and an image forming section that forms an image based on image data generated by the image reading device.

A non-transitory computer-readable recording medium stores a program to be executed by a computer for reading an original document. The reading performed by the computer through execution of the program includes the following procedures: causing an image reading section to read a density reference member to detect a density value of each of a plurality of pixels constituting image data; determining whether or not to at least partially restrict either a read range of the image reading section when the image reading section reads the original document or usage of a result obtained by reading the original document by the image reading section, the determination being made based on a location of a defect in the image reading section or in the density reference member; and determining whether or not to apply a smoothing process to each density value detected by reading the original document by the image reading section, the determination being made based on a comparison between a normal-value determining threshold and each density value obtained by reading the density reference member by the image reading section.

DETAILED DESCRIPTION

The following describes an embodiment with reference to the accompanying drawings. However, the present disclosure is not limited to the specific embodiment below.

Figure 1:
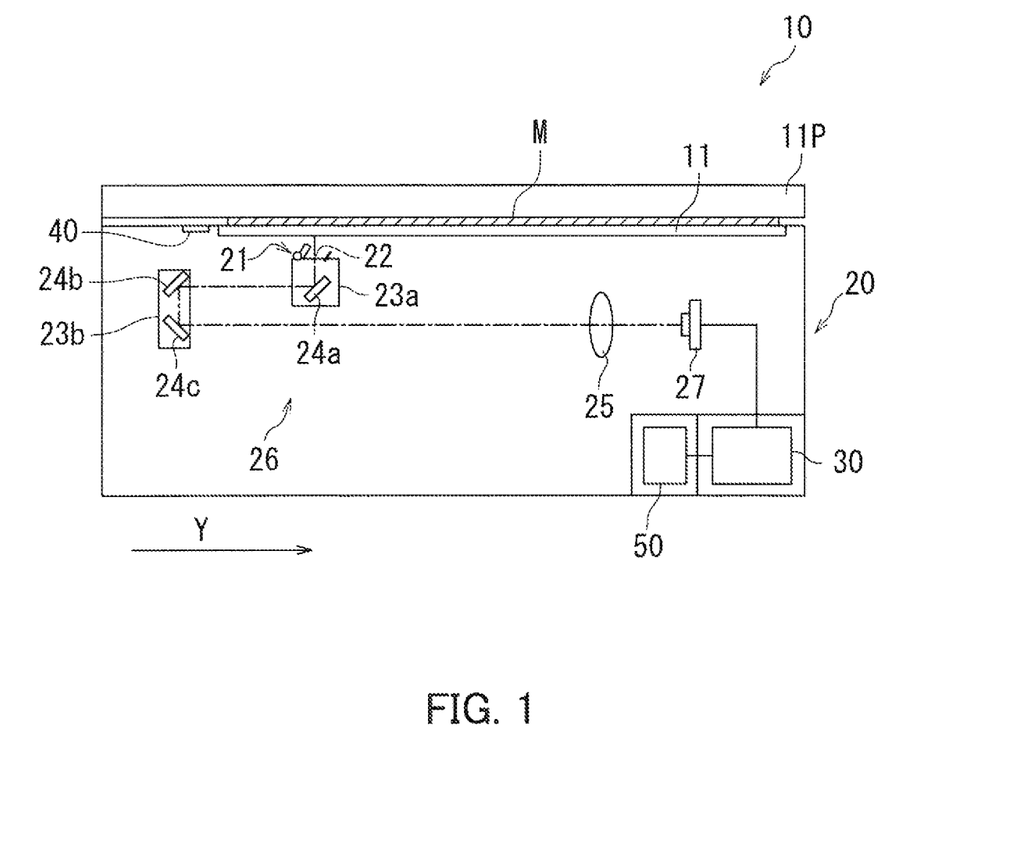
FIG. 1 is a front cross-sectional view schematically showing an image reading device according to an embodiment.
Figure 2A:
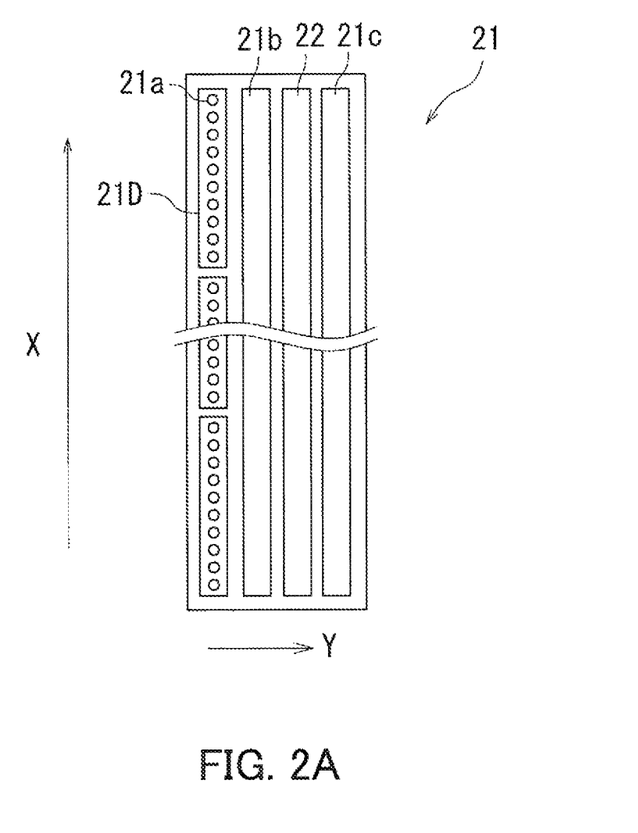
FIG. 2A is a top view schematically showing a light source included in the image reading device according to the present embodiment.
Figure 2B:
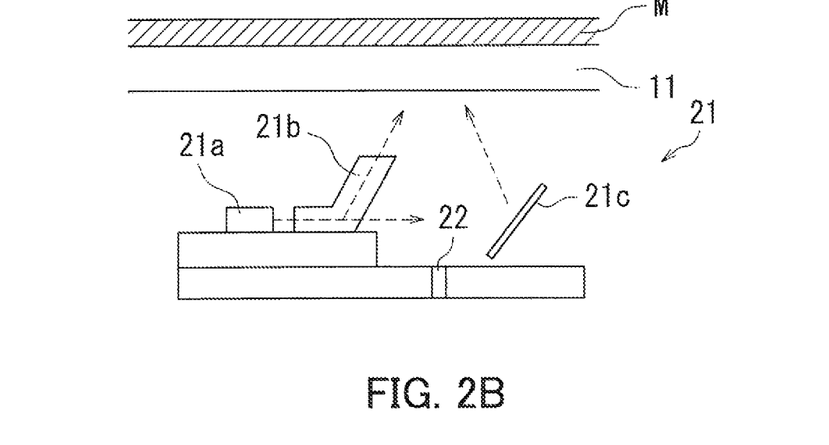
FIG. 2B is a side view schematically showing the light source included in the image reading device according to the present embodiment.

With reference to FIGS. 1, 2A, and 2B, the following describes an embodiment of an image reading device 10. FIG. 1 is a schematic front view of the image reading device 10 according to the present embodiment. FIG. 2A is a schematic a top view of a light source 21 included in the image reading device 10. FIG. 2B is a schematic side view of the light source 21.

The image reading device 10 includes an image reading section 20, an image processing section 30, and a density reference member 40. The image reading section 20 detects density values of the respective pixels constituting image data. The image processing section 30 performs image processing on the image data that is input from the image reading section 20. The image reading section 20 and the image processing section 30 are controlled by a control section 50. For example, the control section 50 includes a special-purpose device provided with a central processing unit (CPU) or a general-purpose computer provided with a CPU.

The image reading device 20 includes the light source 21, an optical system 26, and an imaging section 27. The image reading section 20 is disposed below contact glass 11. A platen cover 11P can be opened and closed relative to the contact glass 11. The optical system 26 includes reflecting mirrors 24a, 24b, and 24c, and a lens 25. The light source 21 and the reflecting mirror 24a are secured to a first carriage 23a. The first carriage 23a has a slit 22. The reflecting mirrors 24b and 24c are secured to a second carriage 23b.

The image reading device 10 reads an original document M placed on the contact glass 11 to obtain image data. More specifically, the image reading device 10 generates image data conforming to an image formed on the original document M. According to the present embodiment, the image reading device 10 is a scanner and the original document M is paper. However, the original document M may, for example, be cloth or a three-dimensional object with a thickness.

The following describes the process in which light emitted by the light source 21 reaches the imaging section 27. The light source 21 elongated in a main scanning direction (X direction in FIG. 2A) illuminates the contact glass 11 from below. Note that the main scanning direction is parallel to the direction of the normal to the paper surface of FIG. 1, whereas the sub-scanning direction is the Y direction.

When the image reading section 20 reads the original document M, the light source 21 irradiates the original document M with light. In addition, when the image reading section 20 reads the density reference member 40 as will be described later, the light source 21 irradiates the density reference member 40 with light. The density reference member 40 is a plate-like member elongated in the main scanning direction, for example. The density reference member 40 may be a white reference member, for example.

Light emitted from the light source 21 is reflected by the original document M or by the density reference member 40 to pass through the slit 22 to reach the reflecting mirror 24a. The light having reached the reflecting mirror 24a is reflected by the reflecting mirror 24a, guided by the reflecting mirrors 24b and 24c to pass through the lens 25 to reach the imaging section 27. The imaging section 27 includes a plurality of photodetectors for receiving light from the lens 25. The imaging section 27 is a charge coupled device (CCD), for example. The imaging section 27 generates an analog electric signal from the light having reached the imaging section 27. Subsequently, an A/D conversion section (not shown) converts the analog signal into a digital signal. The resulting digital signal is sent to the image processing section 30.

As shown in FIGS. 2A and 2B, the light source 21 of the image reading device 10 according to the present embodiment includes a plurality of light-emitting elements 21a, a conductor 21b, and a reflecting mirror 21c. The light source 21 has a plurality of light-source blocks 21D each of which includes two or more of the light emitting elements 21a. For example, each light-source block 21D includes ten light emitting elements 21a. In the image reading device 10 according to the present embodiment, the light emitting elements 21a in each light-source block 21D are connected in series. For example, each light emitting element 21a is a laser emitting diode (LED), for example.

When the light source 21 emits light toward the original document M, a portion of light emitted from the respective light emitting elements 21a passes the conductor 21b to reach the original document M. Another portion of light emitted from the respective light emitting elements 21a is reflected, after passing through the conductor 21b, by the reflecting mirror 21c to reach the original document M.

Reference is again made to FIG. 1. The image reading section 20 can also read images in color. In the case where the light source 21 is a white light source, the white light is separated into individual colors by a color filter (not shown) before reaching the imaging section 27. Consequently, the imaging section 27 receives light of the plurality of colors. The imaging section 27 generates analog electric signals for the respective colors. Alternatively, in the case where the light source 21 emits light of a plurality of colors, the imaging section 27 receives light of the plurality of colors. Typically, the light of the plurality of colors are red light, green light, and blue light.

When the image reading section 20 reads the original document M, the first carriage 23a moves in the sub-scanning direction Y. The second carriage 23b moves so as to keep the optical path length constant between the light source 21 and the imaging section 27.

The result (a plurality of density values) obtained by reading the original document M by the image reading section 20 is corrected based on the result (a plurality of density values) obtained by reading the density reference member 40 by the image reading section 20. Typically, the image reading section 20 reads the density reference member 40 prior to reading the original document M. When the image reading section 20 reads the density reference member 40, each photodetector included in the imaging section 27 receives light emitted from the light source 21 and then reflected by the density reference member 40. Consequently, a plurality of density values corresponding to the respective locations of the pixels constituting image data representing the density reference member 40 are obtained.

The image processing section 30 applies shading correction to the respective density values detected by reading the original document M by the image reading section 20, based on the respective density values detected by reading the density reference member 40 by the image reading section 20.

The shading correction is applied to reduce image degradation. The image degradation may result from, for example, that the amount of light emitted by the light source 21 is not uniform or the sensitivity of the imaging section 27 is not uniform.

By reading the density reference member 40 by the image reading section 20, the density values are obtained for the respective pixels constituting image data representing the density reference member. Ideally, the density values are generally uniform. Otherwise, it is ideal that the change among the density values be gradual. However, the density value of one pixel may be lower than the density values of other pixels. If the density value of any pixel is lower than the density values of other pixels, the grayscale is set to fall within a narrow density range. This leads to degradation in images obtained by reading (the result obtained by reading the original document M by the image reading device 10).

If any of the amount of light emitted by the light source 21, the reflectivity of the density reference member 40, the propagation characteristics of the optical system 26, and the imaging sensitivity of the imaging section 27 is non-uniform when the image reading section 20 reads the density reference member 40, one or more density values detected by the image reading section 20 are reduced. For example, the amount of light emitted by the light source 21 may be non-uniform across the main scanning direction. In another example, the density reference member 40 may have a flaw or dust on its surface and not reflect light uniformly. In a yet another example, the optical system 26 may have a flaw or dust in part and thus not propagate light uniformly. In a yet another example, the imaging sensitivity of the imaging section 27 may not be uniform among the photodetectors.

More specifically, for example, the light source 21 shown in FIG. 2B has the plurality of light-source blocks 21D, and the light emitting elements 21a in each light-source block 21D are connected in series. In this case, when a break occurs in the wiring serially connecting the light emitting elements 21a in one light-source block 21D, none of the light emitting elements 21a within that light-source block 21D emits light. Consequently, the density value of each pixel corresponding to the location of the defect in the light source 21 is lower than the density values of the other pixels, which leads to that the grayscale is set to fall within a narrow density range. Naturally, the quality of read images degrades.

The image processing section 30 of the image reading device 10 according to the present embodiment determines whether each density value is a normal value or a non-normal value based on a normal-value determining threshold. Note that the non-normal values include permissible values in addition to abnormal values. In the following description in this specification, a pixel having a non-normal density value may be referred to also as a non-normal pixel. Note that the non-normal pixels do not include any pixel having an abnormal density value. If non-normal pixels are contiguous for a predetermined number or more, the image processing section 30 of the image reading device 10 according to the present embodiment applies a smoothing process to the density value of each of the contiguous non-normal pixels at the time of reading the original document M.

More specifically, the image processing section 30 determines whether or not to apply the smoothing process to each density value detected by reading the original document M by the image reading section 20. The determination is made based on a comparison between the normal-value determining threshold and each density value detected by reading the density reference member 40 by the image reading section 20. The smoothing process is median filtering or bilateral filtering, for example. With the above arrangement, the quality of an image obtained by reading (reading result) can be improved although at least one or more of the density values detected by reading the original document M are relatively low.

In addition, the image reading device 10 according to the present embodiment is able to specify the location of a defect in the image reading section 20 or in the density reference member 40. The location of the defect is specified by determining whether or not each density value is abnormal value by using an abnormal-value determining threshold that is lower than the normal-value determining threshold. Based on the location of the defect in the image reading section 20 or in the density reference member 40, the image processing section 30 determines whether or not to at least partially restrict either the read range of the image reading section 20 when the image reading section 20 reads the original document M or the usage of the result (a plurality of density values) obtained by reading the original document M by the image reading section 20.

When the read range of the image reading section 20 is partially restricted, the image processing section 30 may specify the orientation of the original document M, the placement location of the original document M, or the size of a readable original document based on the location of the defect in the image reading section 20 or in the density reference member 40, for example. The specification is made in order to ensure that no density value detection is performed on any pixel corresponding to the location of the defect. For example, if the original document M is an A4-size sheet, the image processing section 30 may specify that the orientation of the original document M such that the long edge of the original document M coincides with the lateral direction rather than with the vertical direction.

Typically, the original document M is placed in alignment with the top left corner of the contact glass 11. However, in the case where the pixels in an upper location in the main scanning direction correspond to a defect, placing the original document M in alignment with the top left corner of the contact glass 11 may lead to that the image reading device 10 cannot appropriately read the original document M. For this reason, the image processing section 30 may specify the placement location of the original document M so as to avoid the original document M from being placed in alignment with the top left corner of the contact glass 11. For example, the image processing section 30 may specify the placement location of the original document M such that the original document M is placed in alignment with the center along the left edge of the contact glass 11. The placement location of the original document M may be indicated by causing a portion of the light source 21 to emit light.

Alternatively, if the usage of the reading result (a plurality of density values) obtained by the image reading section 20 is partially restricted, the image processing section 30 may prohibit the usage of the density value of any pixel corresponding to the location of the defect.

In a manner described above, either the read range of the image reading section 20 or the usage of the reading results obtained by the image reading section 20 is restricted at least partially. If an image portion corresponding to a result obtained by reading a specific region is expected to have insufficient image quality, the result obtained by reading the specific region is not presented to the user. This reduces the risk of giving the user a wrong impression that the entire image reading device 10 is defective.

As described above, in the case where an image portion corresponding to a result obtained by reading a specific region has a low but permissible image quality, the image reading device 10 according to the present embodiment can improve the image quality of the image portion corresponding to the result obtained by reading the specific region. This meets the user's demand for continuing the reading operation although the image quality is low to a certain extent. In addition, the image reading device 10 according to the present embodiment can restrict the usage of any region that would result in obtaining an image portion of an insufficient image quality.

In addition, according to the present embodiment, the image processing section 30 of the image reading device 10 determines whether each density value is a normal value, a permissible value, or an abnormal value, based on two different thresholds. When using both the normal-value determining threshold and the abnormal-value determining threshold, the image processing section 30 determines whether each density value detected by reading the density reference member 40 by the image reading section 20 is a normal value, a permissible value, or an abnormal value. The image reading device 10 according to the present embodiment continues the reading operation without limitation if the density values detected by reading the density reference member 40 by the image reading section 20 are neither the specific normal value nor the specific abnormal value (typically, if the respective density values are permissible values).

Here, the image processing section 30 determines whether or not each density value is an abnormal value based on the abnormal-value determining threshold. According to the present embodiment, the image processing section 30 of the image reading device 10 specifies the location of a defect in the image reading section 20 or in the density reference member 40 based on a comparison between the abnormal-value determining threshold and each density value detected by reading the density reference member 40 by the image reading section 20. For example, when the plurality of pixels includes a predetermined number or more contiguous pixels each having an abnormal density value, the image processing section 30 specifies the region corresponding to the contiguous pixels as the location of a defect in the image reading section 20 or in the density reference member 40.

For example, the normal-value determining threshold and the abnormal-value determining threshold are each determined in advance. Alternatively, at least either the normal-value determining threshold or the abnormal-value determining threshold may be set based on the density values obtained by reading the density reference member 40 by the image reading section 20. For example, the normal-value determining threshold and the abnormal-value determining threshold may each be determined so as to have a different predetermined ratio to the peak value of the plurality of density values. In one example, the normal-value determining threshold is within a range of 0.8 to 0.9 times the peak value, whereas the abnormal-value determining threshold is within a range of 0.7 to less than 0.8 times the peak value.

Alternatively, at least either the normal-value determining threshold or the abnormal-value determining threshold may be set based on the average of the density values falling within a predetermined range. As described above, the image processing section 30 may set at least either the normal-value determining threshold or the abnormal-value determining threshold based on one or more of the density values detected by the image reading section 20. Such setting ensures the determinations to be made appropriately despite fluctuations in the result obtained by reading the density reference member 40 due to deterioration with age or the like.

As described above, if non-uniformity occurs in the amount of light emitted by the light source 21, in the reflectivity of the density reference member 40, in the propagation characteristics of the optical system 26, or in the imaging sensitivity of the imaging section 27, one or more of the density values detected by the image reading section 20 may be reduced. The description given below with reference to FIGS. 3A-3D discusses the case where the amount of light emitted by the light source 21 changes while the reflectivity of the density reference member 40, the propagation characteristics of the optical system 26, and the imaging sensitivity of the imaging section 27 remain substantially uniform.

Figure 3A:
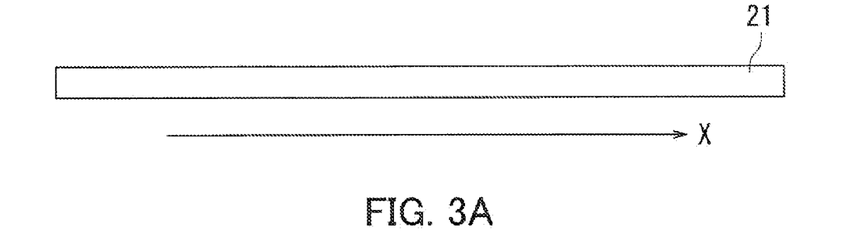
FIG. 3A is a schematic illustration of the amount of light emitted from a normally functioning light source.
Figure 3B:
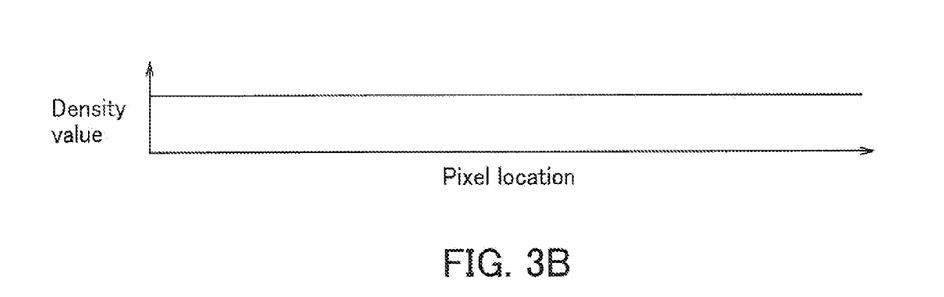
FIG. 3B is a graph showing the distribution of density values detected when a density reference member is read by using a light source functioning normally to emit light.
Figure 3C:
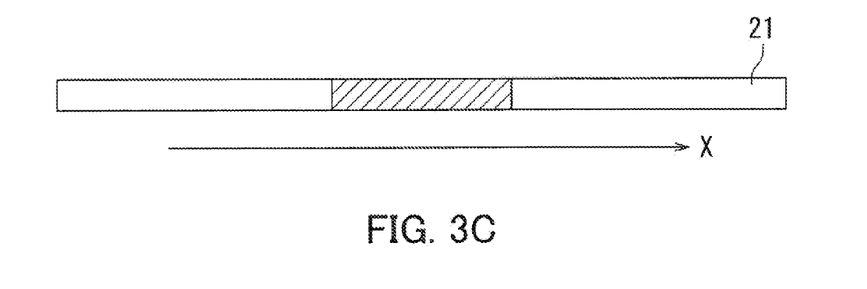
FIG. 3C is a schematic illustration of an example of the amount of light emitted from a partially defective light source.
Figure 3D:
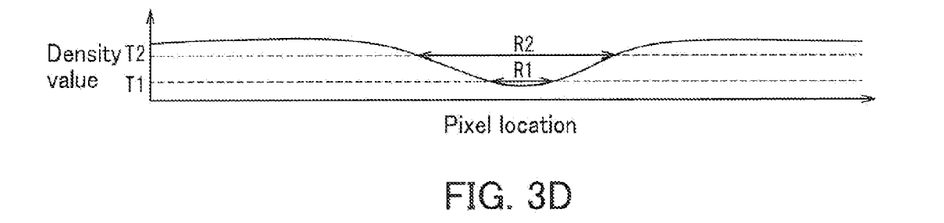
FIG. 3D is a graph showing the distribution of density values detected when the density reference member is read by using a partially defective light source.

With reference to FIGS. 1 and 3A-3D, the following describes the density values detected by reading the density reference member 40 by the image reading section 20. FIG. 3A is a schematic illustration showing the amount of light emitted by the light source 21 in a normal condition. FIG. 3B is a graph indicating the distribution of density values detected when the density reference member 40 is read by using the light source 21 that is normally functioning to emit light. FIG. 3C is a schematic illustration of an example of the amount of light emitted from the partially defective light source 21. FIG. 3D is a graph showing the distribution of density values detected when the density reference member 40 is read by using the partially defective light source 21. In each graph shown in FIGS. 3B and 3D, the horizontal axis represents the pixel location in the main scanning direction, whereas the vertical axis represents the density value of each pixel aligned in the main scanning direction.

As shown in FIG. 3A, the light source 21 emits uniform light when functioning normally. In this case, as shown in FIG. 3B, the density values remain almost constant without any substantial changes across the main scanning direction. As is seen from FIGS. 3A and 3B, the density values are relatively high when the density reference member 40 is read by using the normally functioning light source 21.

On the other hand, if the light source 21 has a defect around the central portion, light is emitted in a normal manner from each end portion of the light source 21, whereas no light is emitted from the central portion of the light source 21 as shown in FIG. 3C. In this case, as shown in FIG. 3D, in an array of pixels aligned in the main scanning direction, the density values of pixels located at the end portions are relatively high, whereas the density values of pixels located around the central portion are relatively low.

According to the present embodiment, the image processing section 30 of the image reading device 10 determines whether each density value detected by reading the density reference member 40 by the image reading section 20 is a normal value, a permissible value, or an abnormal value, based on the normal-value determining threshold and the abnormal-value determining threshold. As is seen from FIGS. 3C and 3D, when the density reference member 40 is read by using the partially defective light source 21, the density values of the pixels corresponding to the central portion of the light source 21 where the defect is present are lower than the normal-value determining threshold T2 and/or the abnormal-value determining threshold T1. Note that the abnormal-value determining threshold T1 is lower than the normal-value determining threshold T2.

A density value lower than the abnormal-value determining threshold T1 is an abnormal value. A density value that is equal to the abnormal-value determining threshold T1 or higher and lower than the normal-value determining threshold T2 is a permissible value. A density value equal to the normal-value determining threshold T2 or higher is a normal value.

Based on the result obtained by reading the density reference member 40 by the image reading section 20, the image processing section 30 counts how many pixels each having a density value lower than the abnormal-value determining threshold T1 are contiguous in the main scanning direction (i.e., counts a contiguous-abnormal-pixel number R1) from among the plurality of pixels. In the following description in this specification, a pixel having a density value lower than the abnormal-value determining threshold T1 may be referred to also as an abnormal pixel.

If the contiguous-abnormal-pixel number R1 is equal to or more than a usage-restriction threshold that is stored in advance, the image processing section 30 determines each light emitting element 21a corresponding to a pixel having a density value lower than the abnormal-value determining threshold T1 as a defective light emitting element. Consequently, either the detection of density values of abnormal pixels (pixels each having a density value lower than the abnormal-value determining threshold T1) when the image reading section 20 reads the original document M or the usage of the detected density values of abnormal pixels is restricted. As described above with reference to FIG. 2A, the light source 21 may have the plurality of light-source blocks 21D. In such a case, the usage-restriction threshold is equal to the number of pixels corresponding to one light-source block 21D (for example, 500 pixels or more and 1,500 pixels or less), for example.

Also based on the result obtained by reading the density reference member 40 by the image reading section 20, the image processing section 30 counts how many pixels each having a density value lower than the normal-value determining threshold T2 are contiguous in the main scanning direction (i.e., counts a contiguous-non-normal-pixel number R2) from among the plurality of pixels. If the contiguous non-normal pixel number R2 is equal to or more than a smoothing-process threshold that is stored in advance, the image processing section 30 applies the smoothing process to the respective density values lower than the normal-value determining threshold T2, the respective density values being detected by reading the original document M by the image reading section 20. Consequently, the quality of images obtained by reading can be improved although the density values detected by reading the original document M include relatively low values.

Figure 4:
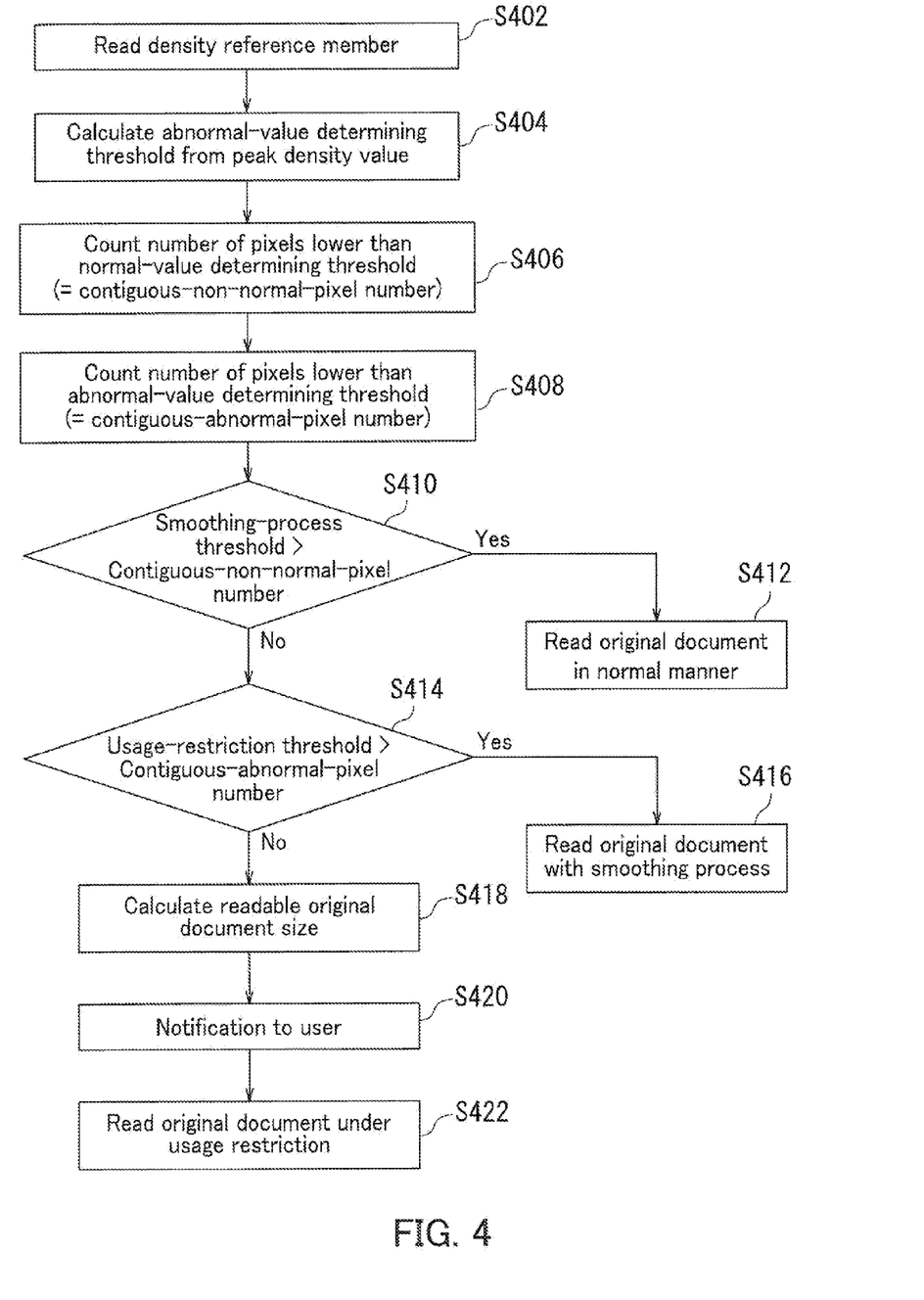
FIG. 4 is a flowchart of an image reading method according to the present embodiment.

The following now describes an image reading method according to the present embodiment, with reference to FIGS. 1, 3A-3D, and 4. FIG. 4 is a flowchart of the image reading method performed by the image reading device 10 according to the present embodiment. The image reading method is performed by following the steps S402 to S422 shown in FIG. 4.

First, as shown in S402, the image reading section 20 reads the density reference member 40 to obtain a plurality of density values.

Next, as shown in S404, the image processing section 30 calculates the abnormal-value determining threshold T1 from the peak value of the plurality of density values. For example, the abnormal-value determining threshold T1 is set to fall within a range of 70% to less than 80% of the peak value of the plurality of the density values. For example, the abnormal-value determining threshold T1 is determined depending on the variations among the plurality of light emitting elements 21a as well as the variations among the plurality of the photodetectors included in the imaging section 27. Suppose, for example, that the variations among the plurality of light emitting elements 21a are within ±10% and the variations among the plurality of photodetectors included in the imaging section 27 are within ±20%. In that case, based on the respective lower limits, the abnormal-value determining threshold T1 is determined to be equal to 72% of the peak value of the plurality of density values.

Next, as shown in S406, the image processing section 30 counts how many pixels each having a density value lower than the normal-value determining threshold T2 (i.e., non-normal pixels) are contiguous in the main scanning direction (i.e., counts the contiguous-non-normal-pixel number R2) from among the plurality of pixels.

Next, as shown in S408, the image processing section 30 counts how many pixels each having a density value lower than the abnormal-value determining threshold T1 (i.e., abnormal pixels) are contiguous in the main scanning direction (i.e., counts a contiguous-abnormal-pixel number R1) from among the plurality of pixels.

Next, as shown in S410, the image processing section 30 determines whether or not the smoothing-process threshold exceeds the contiguous-non-normal-pixel number R2. If the smoothing-process threshold exceeds the contiguous-non-normal-pixel number R2 (S410: Yes), the image reading section 20 reads the original document M in a normal manner as shown in S412.

If the smoothing-process threshold does not exceed the contiguous-non-normal-pixel number R2 (S410: No), the plurality of pixels include non-normal pixels (i.e., pixels each having a density value lower than the normal-value determining threshold T2) that are contiguous at least for the number equal to the smoothing-process threshold. In the following description in this specification, a collection (group) of non-normal pixels (i.e., pixels each having a density value lower than the normal-value determining threshold T2) that are contiguous at least for the number equal to the smoothing-process threshold may be referred to also as a smoothing-process-pixel group. Note that the number of smoothing-process-pixel groups included in the plurality of pixels is not limited to one, and two or more smoothing-process-pixel groups may be included.

As shown in S414, if a smoothing-process-pixel group is included in the plurality of pixels, the image processing section 30 determines whether the usage-restriction threshold exceeds the contiguous-abnormal-pixel number R1. If the usage-restriction threshold exceeds the contiguous-abnormal-pixel number R1 (S414: Yes), the image processing section 30 applies the smoothing process to the density value of each pixel in the smoothing-process-pixel group when the image reading section 20 reads the original document M, as shown in S416.

On the other hand, if the usage-restriction threshold does not exceed the abnormal pixel number R1 (S414: No), the plurality of pixels include abnormal pixels (pixels each having a density value less than the abnormal-value determining threshold T1) that are contiguous at least for the number equal to the usage-restriction threshold. In the following description in this specification, a collection (group) of abnormal pixels (i.e., pixels each having a density value lower than the abnormal-value determining threshold T1) that are contiguous at least for the number equal to the usage-restriction threshold are may also be referred to also as a usage-restriction-pixel group. Note that the number of usage-restriction-pixel groups included in the plurality of pixels is not limited to one, and two or more usage-restriction-pixel groups may be included. Yet, the number of usage-restriction-pixel groups is equal to or less than the number of smoothing-process-pixel groups.

Here, if a usage-restriction-pixel group is included in the plurality of pixels, the read range of the image reading section 20 for reading the original document M is restricted when the image reading section 20 reads the original document M. More specifically, as shown in S418, the image processing section 30 calculates the readable original document size. For example, the readable original document size may be set so as to make available the density values of all of the plurality of pixels, excluding those included in any usage-restriction-pixel group.

Next, as shown in S420, the image reading device 10 notifies the user of the readable original document size. Subsequently, as shown in S422, based on an instruction given by the user, the image reading device 10 reads the original document M under the usage restriction. In this case, the smoothing process may be applied to the density values of the respective pixels in the smoothing-process-pixel group. In the manner described above, the image reading device 10 can read the original document M by using the result obtained by reading the density reference member 40.

As described above, the control section 50 shown in FIG. 1 controls the image processing section 30. The image processing section 30 and the control section 50 may be implemented by a single application specific integrated circuit (ASIC).

In the description given above with reference to FIGS. 2A and 2B, the light source 21 includes the conductor 21b, and light emitted from the plurality of light emitting elements 21a passes through the conductor 21b and then illuminates the original document M or the density reference member 40 directly or via the reflecting mirror 21c. However, the present disclosure is not limited to such. The light source 21 may be without the conductor 21b. In such a case, light emitted from each light emitting element 21a illuminates the original document M or the density reference member 40 directly or via the reflecting mirror 21c. Alternatively, the light source 21 may be without reflecting mirror 21c. In such a case, light emitted from each light emitting element 21a illuminates the original document M or the density reference member 40 directly or via the conductor 21b.

In addition, although the imaging section 27 of the image reading device 10 described above is a charge coupled device (CCD), the image reading device 10 may employ a Contact Image Sensor (CIS) and thus includes a CMOS image sensor as the imaging section 27.

According to the present embodiment, the control section 50 of the image reading device 10 stores a computer program for reading the original document M. The control section 50 reads the stored program to execute procedures corresponding to those described above with reference to FIG. 4. For example, the stored program causes the control section 50 (computer) to execute each of the following procedures. That is, the control section 50 executes a procedure for causing the image reading section 20 to read the density reference member 40 and to detect density values of the respective pixels constituting image data. Subsequently, the control section 50 executes a procedure for determining, based on the location of a defect in the image reading section 20 or in the density reference member 40, whether or not to at least partially restrict either the read range of the image reading section 20 for reading the original document M or the usage of the result (density values) obtained by reading the original document M by the image reading section 20. Next, the control section 50 executes a procedure for determining whether or not to apply the smoothing process to each density value detected by reading the original document M by the image reading section 20. The determination is made based on a comparison of between the normal-value determining threshold and each density value obtained by reading the density reference member 40 by the image reading section 20.

The program may be installed to the image reading device 10 from a non-transitory computer-readable recording medium storing the program during the manufacture of the image reading device 10. The non-transitory computer-readable recording medium is a compact disk (CD) or a digital versatile disk (DVD), for example.

In the description given above with reference to FIGS. 1, 2A, 2B, and 3A-3D, the location of a defect in the image reading section 20 (in particular, in any of the light source 21, the optical system 26, and the imaging section 27) or in the density reference member 40 is detected based on the density values detected by the image reading section 20. More specifically, the location of the defect is specified by determining whether or not each density value is abnormal value by using the abnormal-value determining threshold that is lower than the normal-value determining threshold. In particular, in the description given above with reference to FIGS. 3A-3D, the location of the defect in the light source 21 is specified from the result obtained by reading the density reference member 40 by the image reading section 20. However, the scheme used for specifying the location of a defect is not limited to this. The location of a defect in the light source 21 may be specified by another scheme. For example, as will be described with reference to FIG. 5, the location of a defect in the light source 21 may be specified by detecting a break in the wiring of the light source 21.

Figure 5:
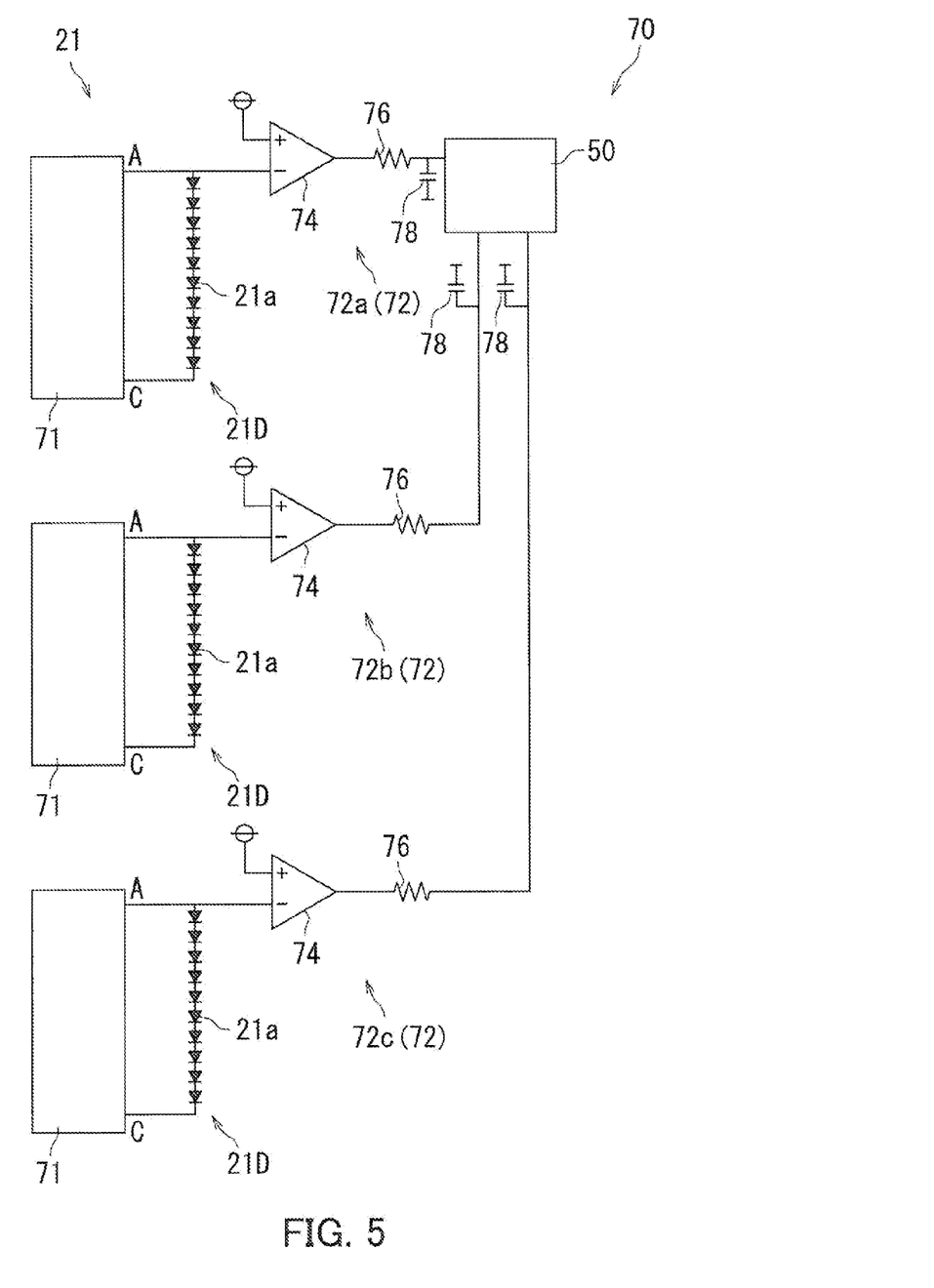
FIG. 5 is a schematic illustration of a defect detecting circuit included in the image reading device according to the present embodiment.

With reference to FIG. 5, the following describes another structure for specifying the location of a defect. FIG. 5 is a schematic circuit diagram of a break detection circuit 70 for detecting a break in the wiring of the light source 21.

The break detection circuit 70 includes a plurality of break detectors 72. Each break detector 72 detects any break in the wiring of the plurality of light emitting elements 21a included in each light-source block 21D shown in FIG. 2A. FIG. 5 shows three light-source blocks 21D and break detector 72a, 72b, and 72c corresponding to the respective light-source blocks 21D.

Each of the break detectors 72a, 72b, and 72c includes a comparator 74, a register 76, and a condenser 78. Each comparator 74 is electrically connected to the control section 50 via a corresponding one of the registers 76, and each capacitor 78 is connected to the control section 50 to be in parallel with the corresponding register 76.

The light emitting elements 21a in each light-source block 21D receive voltage supplied from a corresponding power source 71. In addition, the light emitting elements 21a in each light-source block 21D are all electrically connected to the corresponding power source 71 through wiring. Each set of wiring is electrically connected to an end of the corresponding comparator 74. For example, when all the light emitting elements 21a in each light-source block 21D operate normally, a voltage of 7 V is applied at the one end of each comparator 74. If a break occurs in the wiring of any of the light-source block 21D, a voltage of 11 V is applied at the one end of the corresponding comparator 74. Each comparator 74 is electrically connected at the other end to a reference power supply. For example, a voltage of 10 V is applied at the other end of each comparator 74, for example.

If a break occurs in the wiring of any of the light-source blocks 21D, a signal output from the corresponding comparator 74 changes. This enables the control section 50 to specify the light-source blocks 21D having the break in the wiring. In the manner described above, each of the break detectors 72a, 72b, and 72c can detect a break in the wiring of the corresponding light-source block 21D. Therefore, the image processing section 30 may restrict at least partially either the detection or the usage of density values of pixels corresponding to any light-source block 21D having a break in the wiring when the original document M is read.

Although the image reading device 10 described with reference to FIG. 1 is such that the image reading section 20 is disposed below the contact glass 11, the present disclosure is not limited to such. As will be described later with reference to FIG. 6, the image reading section may be disposed inside the platen cover 11P.

Figure 6:
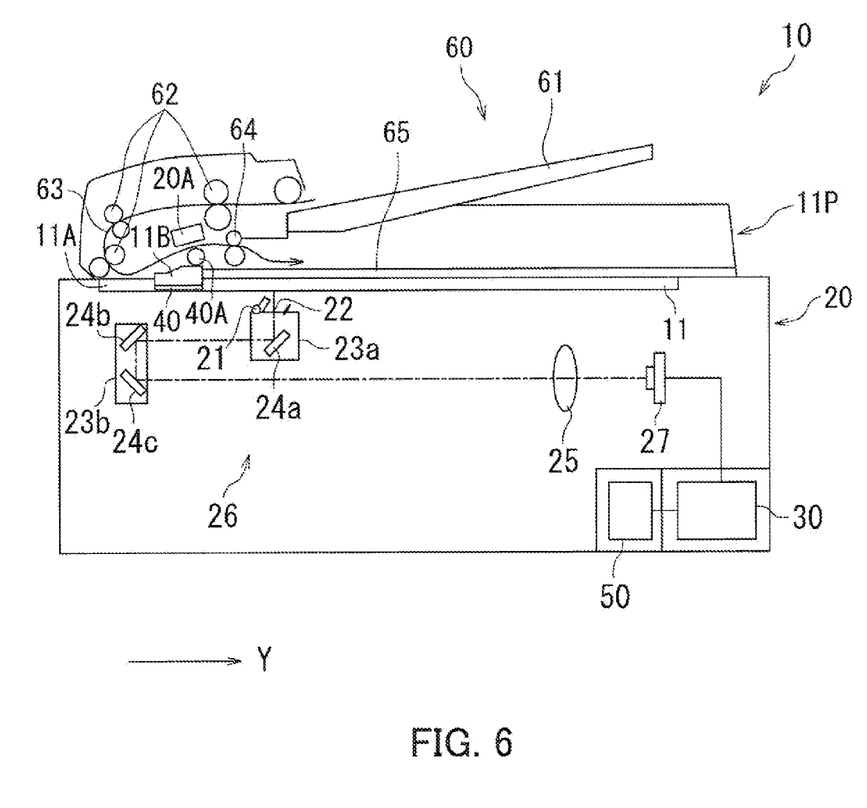
FIG. 6 is a front cross-sectional view schematically showing a different image reading device according to the present embodiment.

With reference to FIG. 6, the following describes a different example of the image reading device 10 according to the present embodiment. FIG. 6 is a front cross-sectional view schematically showing the different example of the image reading device 10 according to the present embodiment. The image reading device 10 shown in FIG. 6 has the basically same structure with the image reading device 10 described with reference to FIG. 1, except for that an auto document feeder (ADF) 60 is additionally included. Therefore, no overlapping description is given in order to avoid redundancy.

As shown in FIG. 6, the auto document feeder 60 includes the platen cover 11P, an image reading section 20A, and a density reference member 40A. The image reading section 20A detects density values of the respective pixels constituting image data. The density reference member 40A may be a white reference roller, for example. In the following description in this specification, the image reading section 20 may be referred to as the first image reading section 20, and the image reading section 20A may be referred to as the second image reading section 20A. In the following description in this specification, in addition, the density reference member 40 may be referred to as the first density reference member 40, and the density reference member 40A may be referred to as the second density reference member 40A.

The auto document feeder 60 can be lifted upward on the pivots disposed in the sub-scanning direction (Y direction) shown in FIG. 6. For example, if an original document is a page of a book or the like, the book is placed on the contact glass 11, which is disposed on the top face of the image reading section 20, for fixed reading. The platen cover 11P can be opened and closed relative to the contact glass 11 for fixed reading and also to contact glass 11A for feed reading.

The auto document feeder 60 includes a document tray 61 for placing the original document to be read, a document conveyance roller pair 62, a document conveyance path 63, a document discharge roller pair 64, and a document discharge tray 65.

The original document(s) placed in the document tray 61 is fed to the document conveyance path 63 sheet by sheet. The original document(s) is then conveyed in succession to make contact with the contact glass 11A for feed reading, which is disposed at the top face of the image reading section 20. Then, the document discharge roller pair 64 ejects each original document having been read to the document discharge tray 65. The image reading section 20 illuminates with light the original document passing along the contact glass 11A for feed reading or the original document placed on the contact glass 11 for fixed reading to generate image data based on light reflected from the original document.

When the original document is read by using the auto document feeder 60, the carriage 23a is fixed at a location under the contact glass 11A for feed reading. On the other hand, when the original document placed on the contact glass 11 for fixed reading is read, the carriage 23a moves below the contact glass 11 for fixed reading in the sub-scanning direction (Y direction). A guide member 11B for guiding conveyance of the original document is disposed between the contact glass 11 for fixed reading and the contact glass 11A for feed reading, and the density reference member 40 is disposed on the lower surface of the guide member 11B.

The image reading section 20A is disposed on the document conveyance path 63. For example, the image reading section 20A reads images with a contact image sensor (CIS). The image reading section 20A is electrically connected to the image processing section 30 via non-illustrated wiring.

The image reading section 20A is disposed, for example, between the contact glass 11A for feed reading and the document discharge roller pair 64. The image reading section 20A reads the rear surface of the two-sided original. That is, the both sides of the original document are read by passing the original document through the document conveyance path 63 only once. Consequently, the both sides of the original document can be readily read without the need for a mechanism for reversing the conveyance direction of the original document or without complicating the document conveyance path 63. The density reference member 40A for obtaining reference density values is disposed to face the second image reading section 20A.

In addition to the location of a defect in the first image reading section 20 or in the first density reference member 40, the image processing section 30 can also specify the location of a defect in the second image reading section 20A or in the second density reference member 40A in the same manner as the specification of the location of a defect in the first image reading section 20 or in the first density reference member 40. Based on the location of the defect in the second image reading section 20A or in the second density reference member 40A, the image processing section 30 determines whether or not to at least partially restrict either the read range of the second image reading section 20A when the second image reading section 20A reads the original document or the usage of the result (a plurality of density values) obtained by reading the original document by the second image reading section 20A.

In addition, the image processing section 30 also determines whether or not to apply the smoothing process to the density values detected by reading the original document with the second image reading section 20A. The determination is made based on a comparison between the normal-value determining threshold and each density value detected by reading the second density reference member 40A by the second image reading section 20A.

Figure 7:
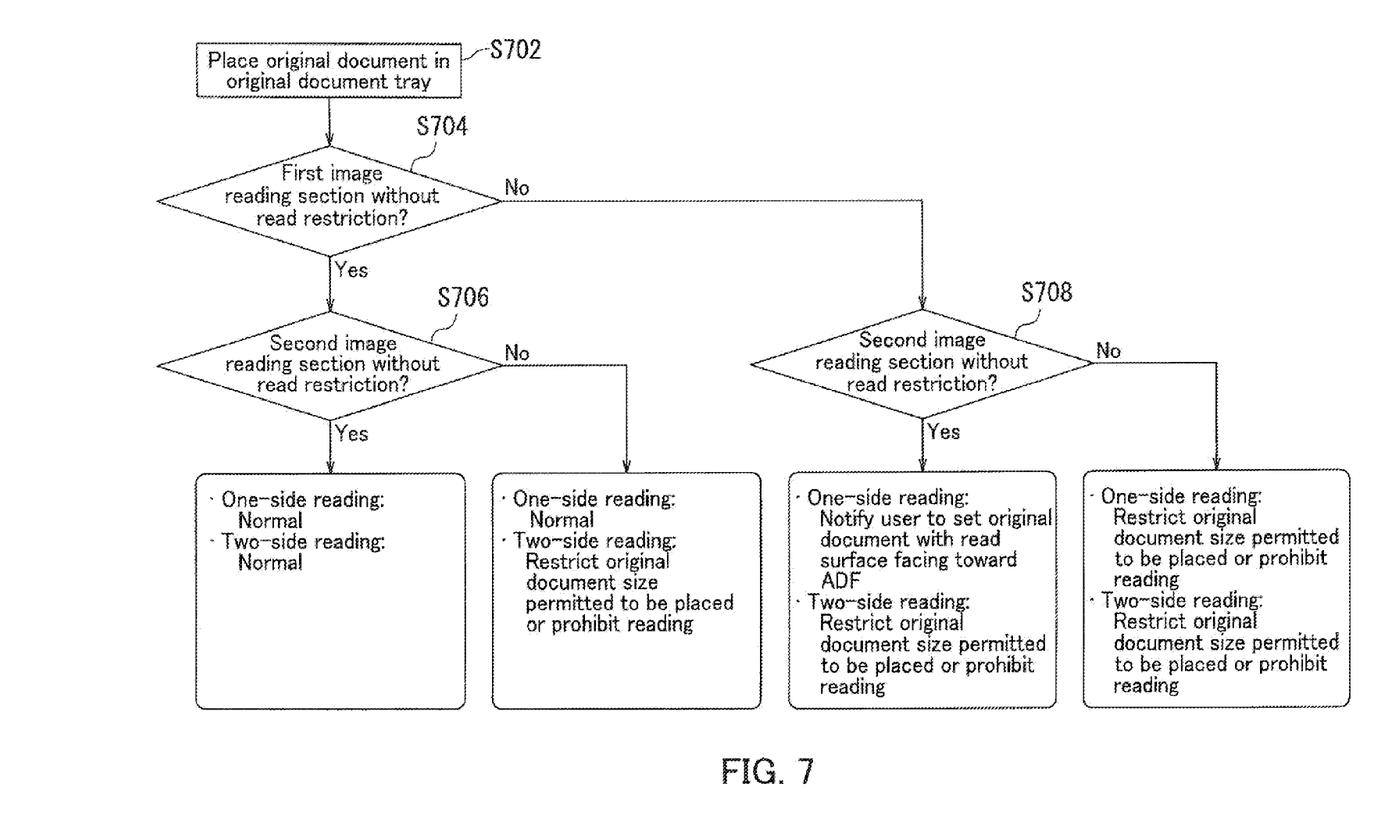
FIG. 7 is a flowchart of a different example of the image reading method according to the present embodiment.

The following now describes a different example of the image reading method, with reference to FIGS. 6 and 7. FIG. 7 is a flowchart of the image reading method performed by the image reading device 10 shown in FIG. 6.

First, an original document is placed in the document tray 61 as shown in S702. In response, as shown in S704, the first image reading section 20 reads the first density reference member 40, and the image processing section 30 determines whether or not the first image reading section 20 is without any read retraction.

As shown in S706, if the first image reading section 20 is without a read restriction (S704: Yes), the second image reading section 20A reads the second density reference member 40A and the image processing section 30 determines whether or not the second image reading section 20A is without any read restriction.

If the second image reading section 20A is without a read restriction (S706: Yes), both the first image reading section 20 and the second image reading section 20A is capable of normal reading. In this case, the image reading device 10 can normally read both sides of the original document placed in the document tray 61 without any restriction on the readable size.

If the second image reading section 20A is with a read restriction (S706: No), it means that the first image reading section 20 is without a read restriction, whereas the second image reading section 20A is with the read restriction. Usually, the original document is placed in the document tray 61 with the surface to be read facing up. Therefore, when the original document is placed in the document tray 61 in a usual manner, the surface to be read is read by the first image reading section 20. That is, the image reading device 10 can read the one side of the original document placed in the document tray 61 without any restriction on the readable size. On the other hand, in the case of reading the both sides of the original document, because of the read restriction imposed on the second image reading section 20A, the image reading device 10 restricts the size of the original document permitted to be placed in the document tray 61 or prohibits any two-side reading.

In the case where the first image reading section 20 is with a read restriction (S704: No), the image processing section 30 determines whether or not the second image reading section 20A is without any read restriction, as shown in S708. If the second image reading section 20A is without a read restriction (S708: Yes), it means that the first image reading section 20 is with a read restriction, whereas the second image reading section 20A is without a read restriction. In this case, the image reading device 10 informs the user to place the original document in the document tray 61, with the surface to be read facing down. As long as the original document is placed in the document tray 61 to have the surface to be read face down, the image reading device 10 can read the one side of the original document placed in the document tray 61 without any restriction on the readable size. In the case of reading the both sides of the original document, because of the read restriction imposed on the first image reading section 20, the image reading device 10 restricts the size of the original document permitted to be placed in the document tray 61 or prohibits any two-side reading.

In the case where the second image reading section 20A is with a read restriction (S708: No), it means that both the first image reading section 20 and the second image reading section 20A are with their respective read restrictions. In this case, the image reading device 10 restricts the size of the original document permitted to be placed in the document tray 61 even for the one-side reading or to prohibit any reading. Naturally, the image reading device 10 restricts the size of the original document permitted to be placed in the document tray 61 for the two-side reading or to prohibit any reading.

Figure 8:
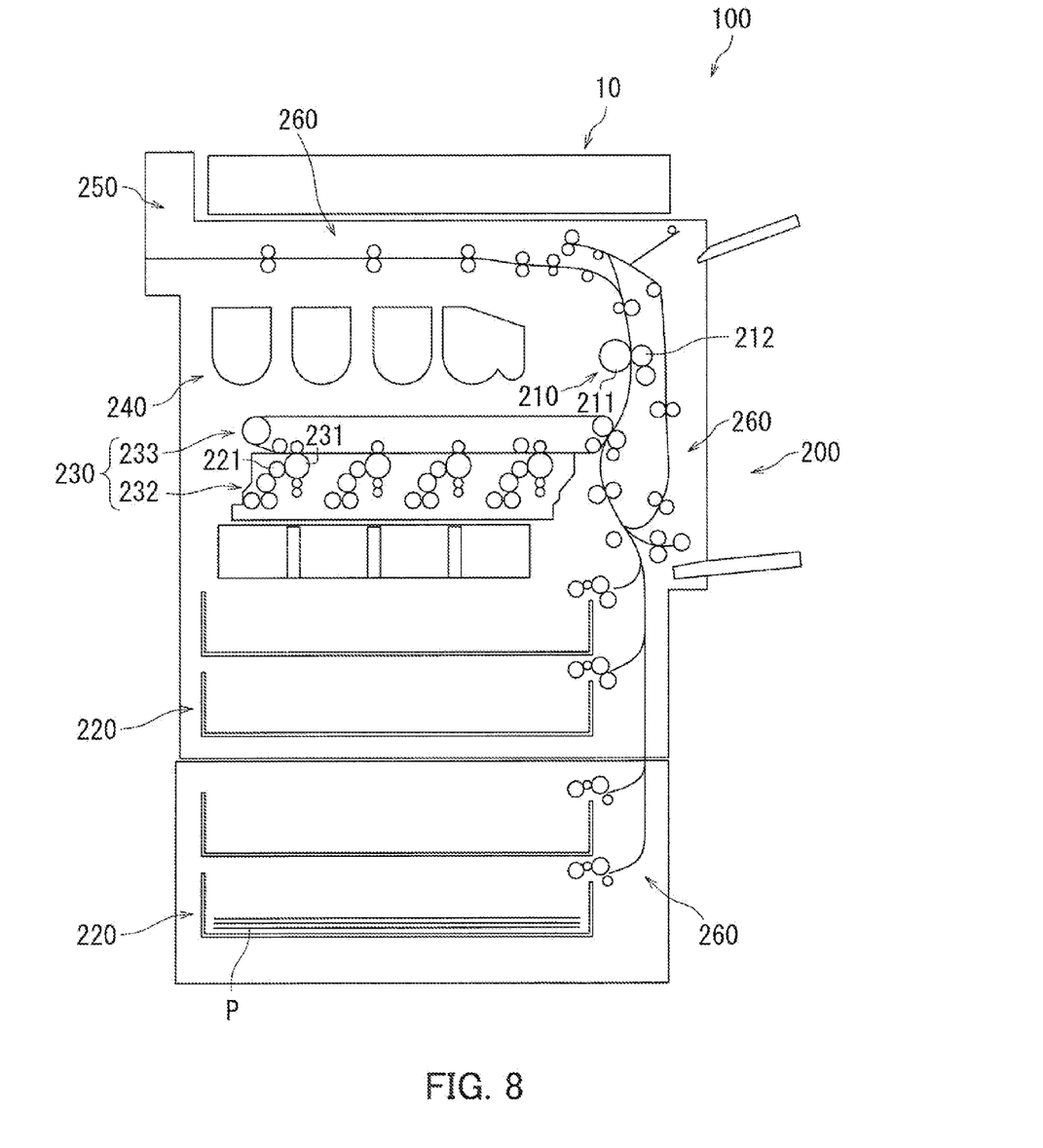
FIG. 8 is a front cross-sectional view schematically showing an image forming apparatus according to the present embodiment.

According to the description given above, the image reading device 10 reads the original document M to generate image data. However, an image may be formed on a recording medium based on image data generated by the image reading device 10 in a manner described below with reference to FIG. 8. FIG. 8 is a schematic illustration of an image forming apparatus 100 according to the present embodiment. According to the present embodiment, the image forming apparatus 100 is a copier. According to the present embodiment, in addition, a recording medium is paper P.

The image forming apparatus 100 includes the image reading device 10 and an image forming section 200. The image forming section 200 includes a fusing device 210, a plurality of paper feed cassettes 220, an imaging section 230, a plurality of toner replenishment devices 240, a paper discharge section 250, and a paper conveyance section 260. The image reading device 10 reads the original document M to obtain image data. The image forming section 200 forms an image on the paper P based on the image data generated by the image reading device 10.

The paper feed cassette 220 is loaded with paper P used for printing. When a copy is produced, the paper P loaded in the paper feed cassette 220 is conveyed by the paper conveyance section 260 sequentially to the imaging section 230 and the fusing device 210 and then discharged from the paper discharge section 250.

The imaging section 230 forms toner images on the paper P. The imaging section 230 includes a plurality of photosensitive members 231, a plurality of developing devices 232 disposed for the respective photosensitive members 231, and a transfer device 233. An electrostatic latent image is formed on each photosensitive member 231 through the laser scanning performed based on the image data generated by the image reading device 10. Each developing device 232 includes a development roller 221. Each development roller 221 supplies toner to the corresponding photosensitive member 231. As a result, toner images are formed on the respective photosensitive members 231. Each toner replenishment device 240 replenishes the corresponding developing device 232 with toner.

The transfer device 233 transfers the toner images from the respective photosensitive members 231 to the paper P such that the toner images are superimposed on one another.

The fusing device 210 includes a fusing member 211 and a pressure member 212 to apply heat and pressure to the paper P in order to fuse unfixed toner images formed by the imaging section 230 to the paper P.

Note that the image forming apparatus 100 is not limited to a copier. The image forming apparatus 100 may be a copier, a printer, a facsimile machine, or a multifunction peripheral combining their functions.

What is claimed is:

1. An image reading device for reading an original document, comprising:
   a first image reading section configured to detect a density value of each of a plurality of pixels constituting image data;
   a first density reference member; and
   an image processing section configured to perform image processing on the image data,
   the image processing section
      specifying a location of a defect in the first image reading section or in the first density reference member based on a comparison between an abnormal-value determining threshold and each density value detected by reading the first density reference member by the first image reading section, the abnormal-value determining threshold being lower than a normal-value determining threshold,
      determining whether or not to at least partially restrict either a read range of the first image reading section when the first image reading section reads the original document or usage of a result obtained by reading the original document by the first image reading section, the determination being made based on the location of the defect in the first image reading section or in the first density reference member, and
      determining whether or not to apply a smoothing process to each density value detected by reading the original document by the first image reading section, the determination being made based on a comparison between the normal-value determining threshold and each density value detected by reading the first density reference member by the first image reading section.

2. An image reading device according to claim 1, wherein the image processing section sets at least either the normal-value determining threshold or the abnormal-value determining threshold based on one or more of the plurality of density values detected by reading the first density reference member by the first image reading section.

3. An image reading device according to claim 1, wherein the image processing section
 determines whether or not the plurality of pixels include abnormal pixels that are contiguous at least for a number equal to a usage-restriction threshold based on a result obtained by reading the first density reference member by the first image reading section, each abnormal pixel having a density value lower than the abnormal-value determining threshold, and
 partially restricts, if the abnormal pixels are contiguous at least for the number equal to the usage-restriction threshold, either detection of the density values of the contiguous abnormal pixels when the first image reading section reads the original document or usage of the detected density values of the contiguous abnormal pixels.

4. An image reading device according to claim 1, wherein the image processing section changes a readable size of the original document based on the location of the defect.

5. An image reading device according to claim 1, wherein the image processing section
 determines whether or not the plurality of pixels include non-normal pixels that are contiguous at least for a number equal to a smoothing-process threshold based on a result obtained by reading the first density reference member by the first image reading section, each non-normal pixel having a density value lower than the normal-value determining threshold, and
 applies, if the non-normal pixels are contiguous at least for the number equal to the smoothing-process threshold, a smoothing process to the density value of each of the contiguous non-normal pixels when the first image reading section reads the original document.

6. An image reading device according to claim 1, wherein the image processing section includes
 a light source configured to emit light, and
 an imaging section that includes a plurality of photodetectors configured to receive light emitted from the light source and then reflected by the first density reference member or by the original document, and
 the plurality of density values are detected by receiving light by the photodetectors.

7. An image reading device according to claim 6, wherein the light source has a plurality of light-source blocks each including a plurality of light emitting elements.

8. An image reading device according to claim 6, wherein if the read range of the first image reading section is partially restricted when the first image reading section reads the original document, the light source illuminates to indicate a position for placing the original document.

9. An image reading device according to claim 6, further comprising
 a break detection circuit configured to detect a break in the light source.

10. An image reading device according to claim 1, further comprising:

a second image reading section configured to detect a density value of each of the plurality of pixels constituting the image data; and a second density reference member, and the image processing section
 determines whether or not to at least partially restrict either a read range of the second image reading section when the second reading section reads the original document or usage of a result obtained by reading the original document by the second image reading section, the determination being made based on a location of a defect in the second image reading section or in the second density reference member, and
 determines whether or not to apply a smoothing process to each density value detected by reading the original document by the second image reading section, the determination being made based on a comparison between the normal-value determining threshold and each density value obtained by reading the second density reference member by the second image reading section.

11. An image reading device according to claim 10, further comprising:
 contact glass on which the original document is placed; and
 a platen cover configured to be opened and closed relative to the contact glass, wherein
 the first image reading section is disposed below the contact glass, and
 the second image reading section is disposed inside the platen cover.

12. An image reading device according to claim 10, wherein
 the image processing section specifies one of an orientation of the original document to be placed, a position of the original document to be placed, or a readable size of the original document, based on the location of the defect in the first image reading section, the first density reference member, the second image reading section, or the second density reference member.

13. An image forming apparatus comprising:
 an image reading device according to claim 1; and
 an image forming section configured to form an image based on image data generated by the image reading device.

14. A non-transitory computer-readable recording medium storing a program to be executed by a computer for reading an original document, the reading executed by the computer comprising:
 causing an image reading section to read a density reference member to detect a density value of each of a plurality of pixels constituting image data;
 specifying a location of a defect in the image reading section or in the density reference member based on a comparison between an abnormal-value determining threshold and each density value detected by reading the density reference member by the image reading section, the abnormal-value determining threshold being lower than a normal-value determining threshold;
 determining whether or not to at least partially restrict either a read range of the image reading section when the image reading section reads the original document or usage of a result obtained by reading the original document by the image reading section, the determination being made based on the location of the defect in the image reading section or in the density reference member; and determining whether or not to apply a smoothing process to each density value detected by reading the original document by the image reading section, the determination being made based on a comparison between the normal-value determining threshold and each density value detected by reading the density reference member by the image reading section.

* * * * *